US010452751B2

United States Patent
Wezorek

(10) Patent No.: US 10,452,751 B2
(45) Date of Patent: Oct. 22, 2019

(54) METHOD OF VISUALLY INTERACTING WITH A DOCUMENT BY DYNAMICALLY DISPLAYING A FILL AREA IN A BOUNDARY

(71) Applicant: BLUEBEAM, INC., Pasadena, CA (US)

(72) Inventor: Joseph W. Wezorek, Pasadena, CA (US)

(73) Assignee: Bluebeam, Inc., Pasadena, CA (US)

( * ) Notice: Subject to any disclaimer, the term of this patent is extended or adjusted under 35 U.S.C. 154(b) by 0 days.

(21) Appl. No.: 15/864,989

(22) Filed: Jan. 8, 2018

(65) Prior Publication Data

US 2018/0196787 A1    Jul. 12, 2018

Related U.S. Application Data

(60) Provisional application No. 62/444,234, filed on Jan. 9, 2017.

(51) Int. Cl.
```
H03M 7/30      (2006.01)
G06F 17/21     (2006.01)
G06T 11/40     (2006.01)
G06T 13/80     (2011.01)
G06F 16/93     (2019.01)
G06F 3/0484    (2013.01)
G06T 11/60     (2006.01)
```

(52) U.S. Cl.
CPC ........ G06F 17/212 (2013.01); G06F 3/04842 (2013.01); G06F 16/93 (2019.01); G06T 11/40 (2013.01); G06T 11/60 (2013.01); G06T 13/80 (2013.01); *G06F 17/211* (2013.01); *G06T 2200/24* (2013.01); *G06T 2210/04* (2013.01)

(58) Field of Classification Search
CPC ................................. G06T 11/40; G06T 13/80
USPC ......................................................... 715/273
See application file for complete search history.

(56) References Cited

U.S. PATENT DOCUMENTS 5,694,536 A * 12/1997 Gangnet ............... G06T 11/203
345/442
7,038,680 B2    5/2006 Pitkow
(Continued)

OTHER PUBLICATIONS

International Search Report and Written Opinion dated Apr. 5, 2018 in International Application No. PCT/US18/12902 (11 pages).

*Primary Examiner* — Cesar B Paula
*Assistant Examiner* — Luu-Phuong T Nguyen
(74) *Attorney, Agent, or Firm* — Bookoff McAndrews, PLLC

(57) ABSTRACT

A method of visually interacting with an electronically stored document having a plurality of visual objects. The method includes accessing the document that includes a closed region characterized by an open area boundary surrounding an open area. The method further includes displaying the document on a display. The method further includes receiving a user input of a region of interest within the document and in the open area. The method further includes iteratively, in a time interval of multiple segments, dynamically displaying a fill area in each of the multiple time segments. The fill area is defined by outwardly expanding vertices from the region of interest and bounded by an expanding fill perimeter limited by the open area boundary. The fill area is coextensive with the open area upon the fill perimeter coinciding with the open area boundary.

13 Claims, 11 Drawing Sheets

(56) References Cited

U.S. PATENT DOCUMENTS

| | | | |
|---|---|---|---|
| 7,123,766 B2* | 10/2006 | Mao | G06K 9/3233 |
| | | | 382/154 |
| 8,751,963 B1 | 6/2014 | Carasso et al. | |
| 9,569,695 B2* | 2/2017 | Pau | |
| 2004/0103366 A1 | 5/2004 | Peyton-Jones et al. | |
| 2004/0205548 A1 | 10/2004 | Bax et al. | |
| 2007/0061698 A1 | 3/2007 | Megiddo et al. | |
| 2007/0168382 A1 | 7/2007 | Tillberg et al. | |
| 2008/0038002 A1* | 2/2008 | Ono | G06F 3/1204 |
| | | | 399/2 |
| 2009/0254576 A1 | 10/2009 | Baris et al. | |
| 2009/0318168 A1* | 12/2009 | Khosravy | G06Q 30/0241 |
| | | | 455/456.3 |
| 2010/0091104 A1* | 4/2010 | Sprigle | A61B 5/0059 |
| | | | 348/136 |
| 2012/0194535 A1* | 8/2012 | Hill | G06T 11/40 |
| | | | 345/581 |
| 2012/0254747 A1* | 10/2012 | Bocirnea | G06F 3/04845 |
| | | | 715/702 |
| 2012/0330447 A1* | 12/2012 | Gerlach | G01B 11/24 |
| | | | 700/95 |
| 2014/0223347 A1* | 8/2014 | Seo | G06F 3/0482 |
| | | | 715/769 |
| 2014/0282231 A1* | 9/2014 | Foreman | G06F 9/451 |
| | | | 715/792 |
| 2016/0063722 A1 | 3/2016 | Allred et al. | |

* cited by examiner

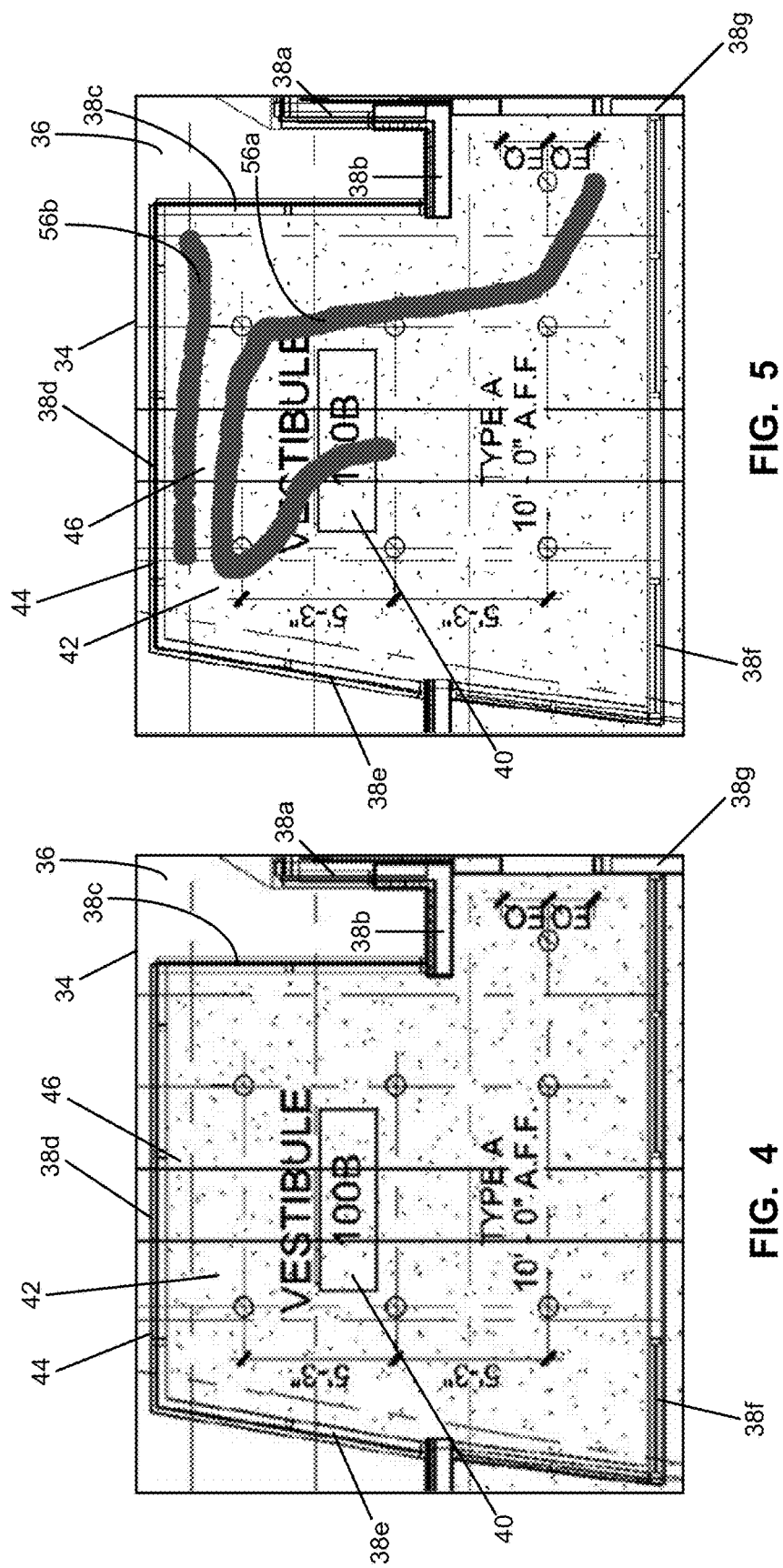

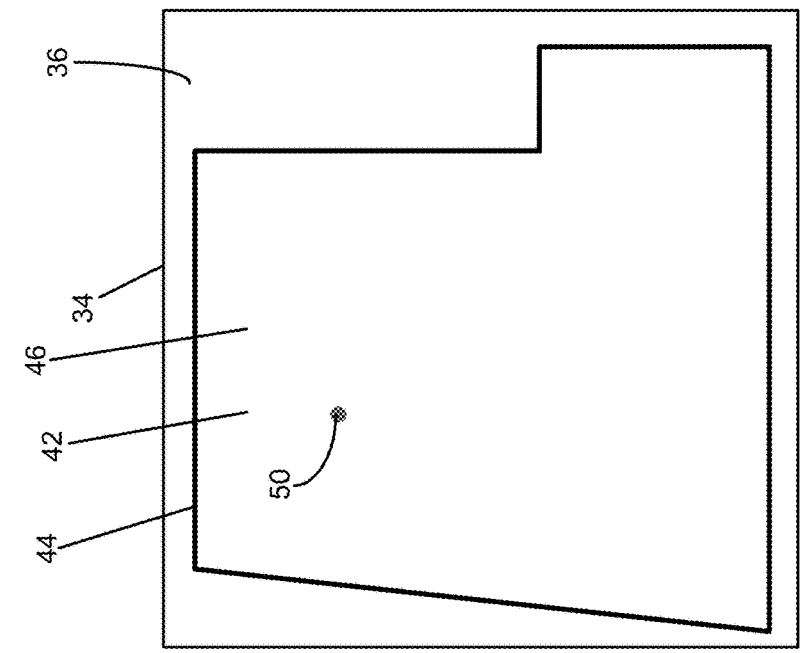
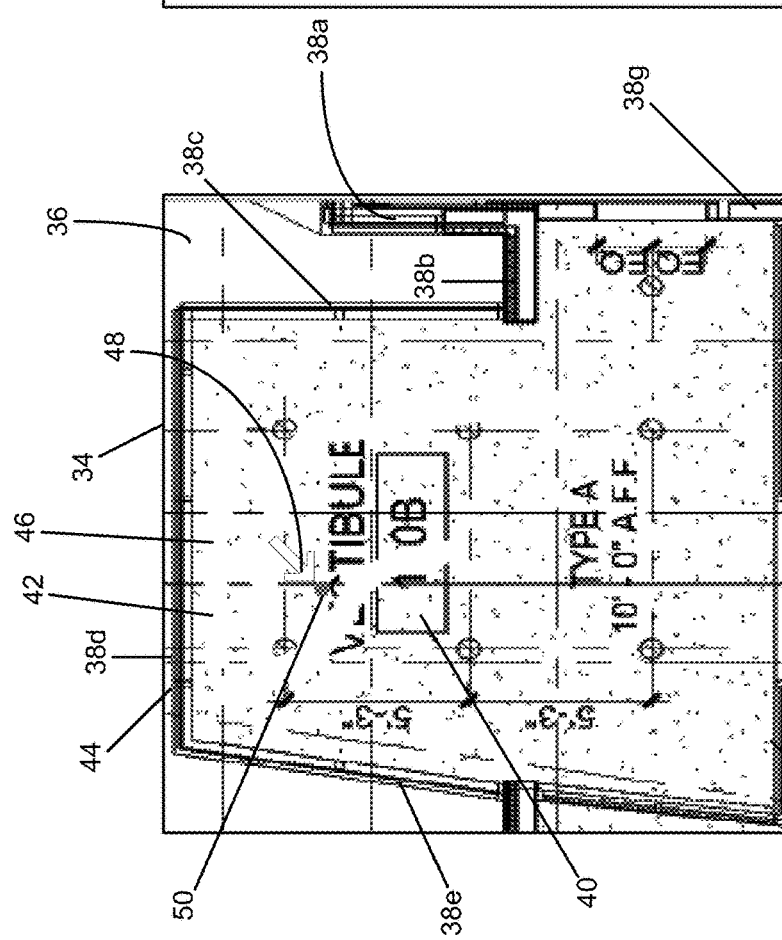
FIG. 7a
FIG. 7

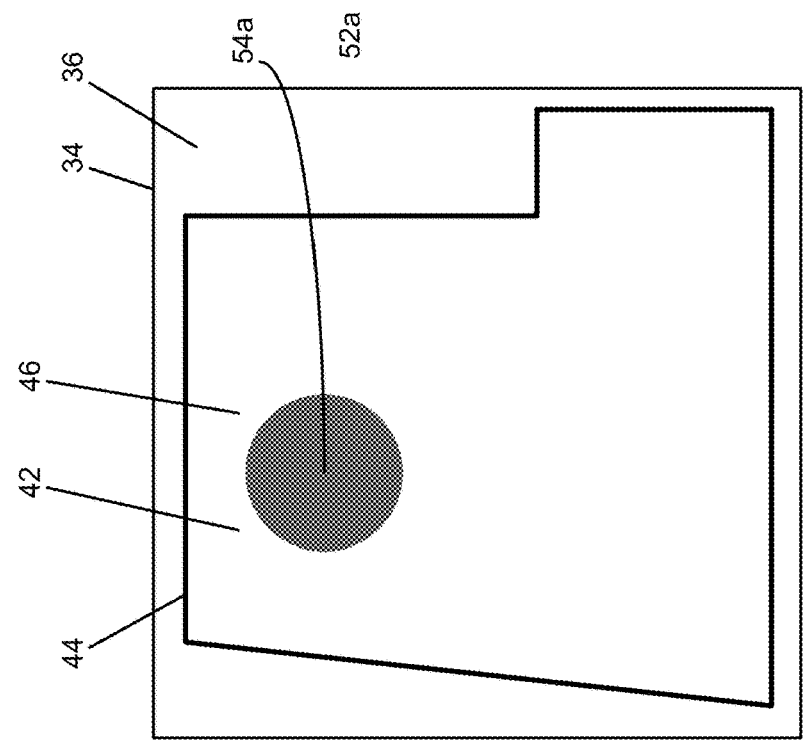
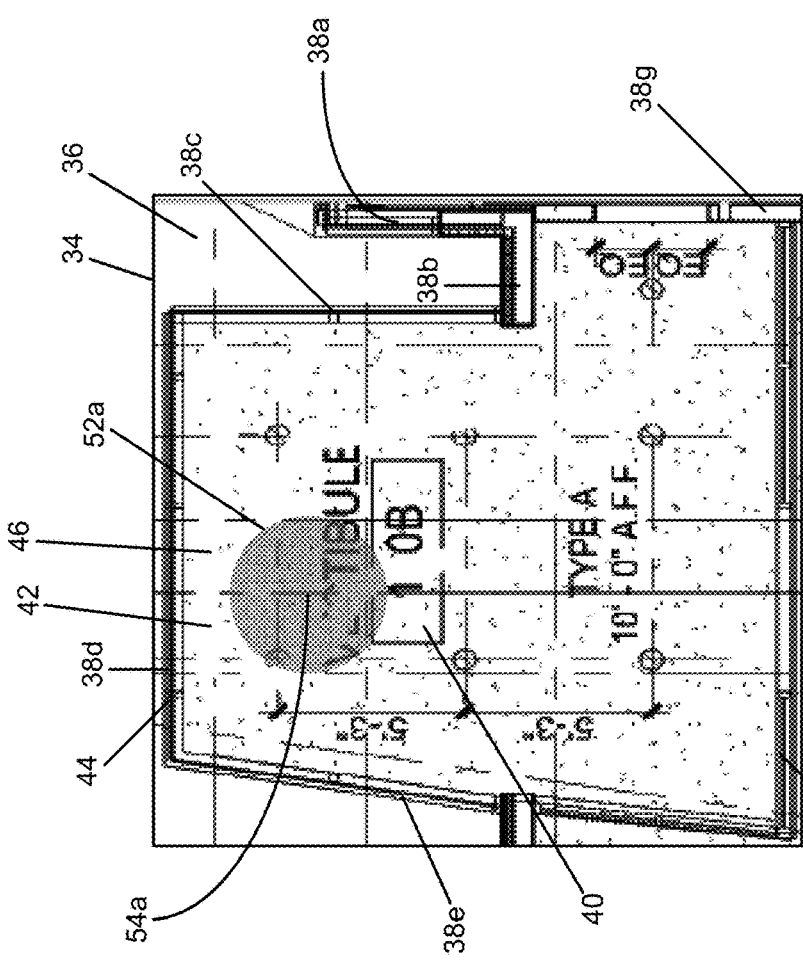

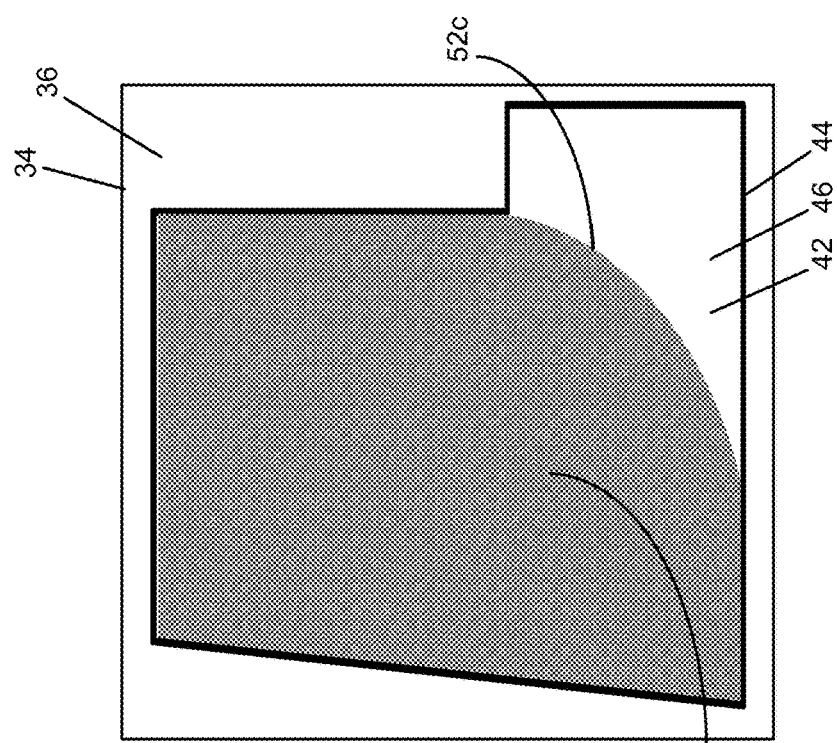
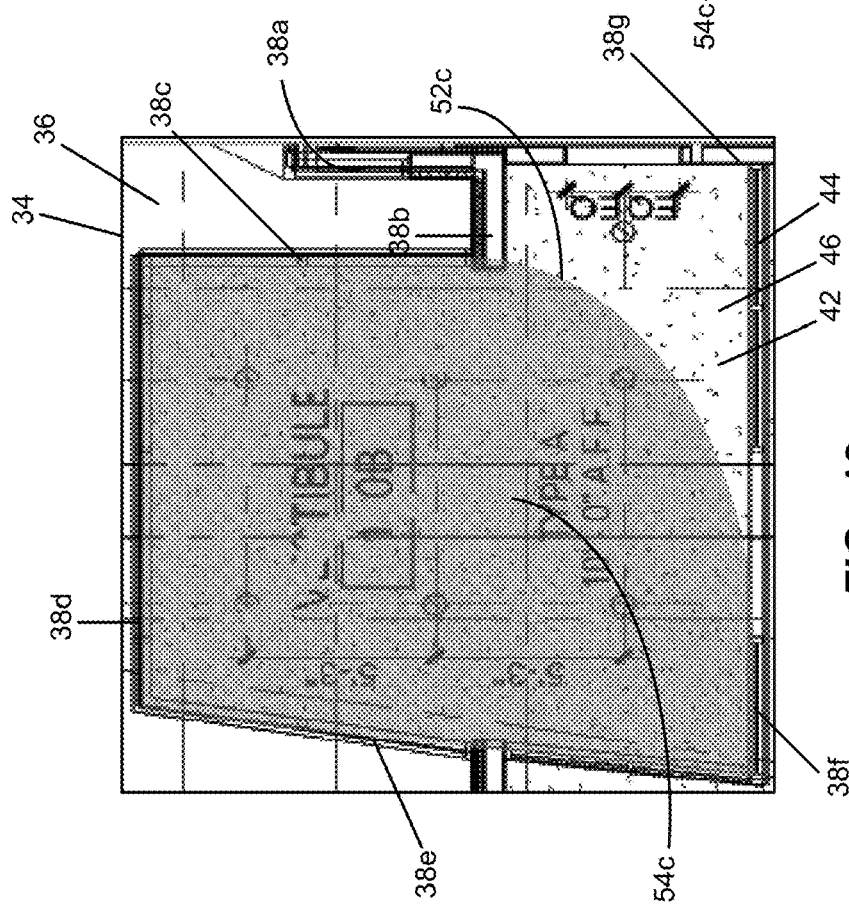

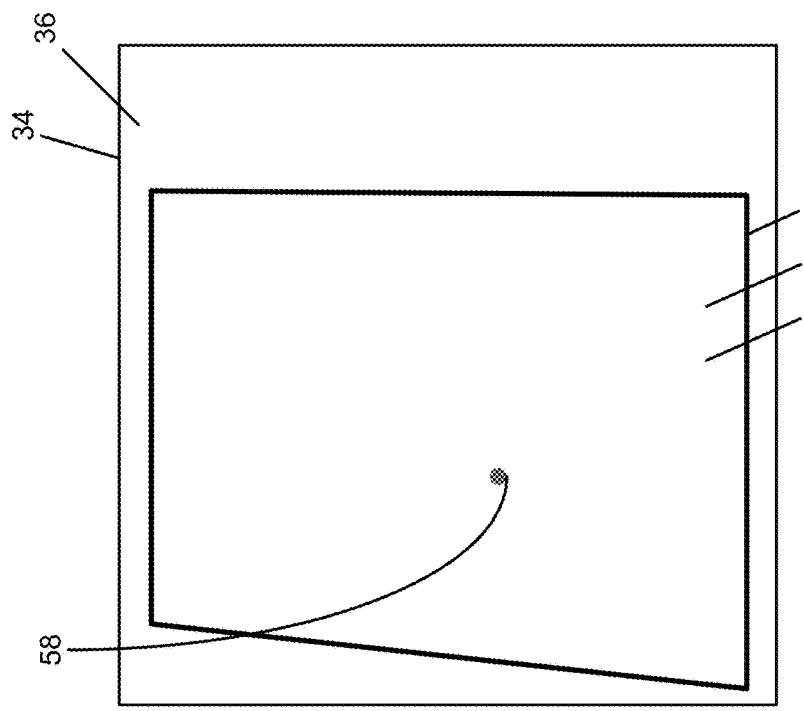
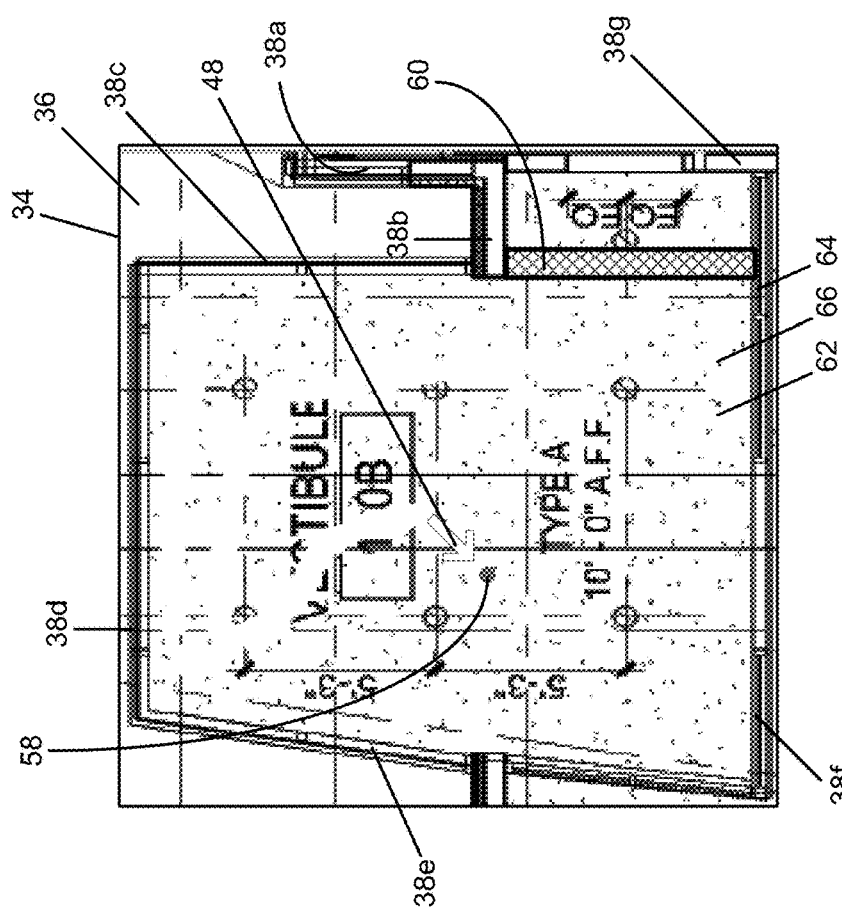

METHOD OF VISUALLY INTERACTING WITH A DOCUMENT BY DYNAMICALLY DISPLAYING A FILL AREA IN A BOUNDARY

CROSS-REFERENCE TO RELATED APPLICATIONS

This non-provisional patent application claims the benefit of priority to U.S. Provisional Patent Application Ser. No. 62/444,234, entitled METHOD OF DETERMINING BORDERS OF A REGION OF A FLOORPLAN, filed on Jan. 9, 2017, the entire contents of which are herein incorporated by reference.

STATEMENT RE: FEDERALLY SPONSORED RESEARCH/DEVELOPMENT

Not Applicable

BACKGROUND

1. Technical Field

The present disclosure relates generally a method of visually interacting with a document by dynamically displaying a fill area in a boundary.

2. Related Art

The designing and constructing of building structures requires highly detailed and annotated construction documents, blueprints, floorplans, engineering drawings, architectural plans, and so forth. In electronic form, these may be generally referred to as documents, and may be generated and manipulated by computer software applications that are specific thereto.

Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed. The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 32000-1:2008. Currently, PDF is utilized to encode a wide variety of document types, including those composed largely of text, and those composed largely of vector and raster graphics. Because of its versatility and universality, files in the PDF format are often preferred over more particularized file formats of specific applications. Users in the Architecture, Engineering, and Construction (AEC) industry often work with very large PDF files.

Material take off (MTO) is a term used in engineering and construction, and refers to a list of materials with quantities, characteristics and/or types that are required to build a designed structure or item. A list of required materials for construction is sometimes referred to as the material take off list (MTOL). This list is generated by analyzing architectural, blueprint, construction or other design documents and determining the materials and their characteristics that are required to accomplish the design. The design documents are annotated with information at various locations about a work location that is used to generate a material take off list. For example, a kitchen location may be annotated with information regarding floor tiles to be used (and may include information regarding area, linear measurements, tile type, tile weight, etc.). The material take off may be used to create a bill of materials. Material take off is not limited to the quantity or amount of required material, but also the weight of the items taken off. This is important in the context of logistics and movement of the required materials. Material take off analysis of design documents is routinely performed to gather the desired information concerning flooring areas and the materials to be used thereat.

There are various software tools and programs that facilitate such material take off analysis. However, these require the user to precisely identify various points about the design document to define a perimeter or border for determining an area or otherwise require user intervention to assist in the identification of portions of a perimeter after a computerized determination of a perimeter is incorrect.

Accordingly, there is a need in the art for a method of document analysis in comparison to the prior art.

BRIEF SUMMARY

The present invention contemplates a method of visually interacting with an electronically stored document having a plurality of visual objects. The method includes accessing the document. The document includes a closed region characterized by an open area boundary surrounding an open area. The method further includes displaying the document on a display. The method further includes receiving a user input of a region of interest within the document and in the open area. The method further includes iteratively, in a time interval of multiple segments, dynamically displaying a fill area in each of the multiple time segments. The fill area is defined by outwardly expanding vertices from the region of interest and bounded by an expanding fill perimeter limited by the open area boundary. The fill area is coextensive with the open area upon the fill perimeter coinciding with the open area boundary.

According to various embodiments of the present invention, the method may further include calculating a quantity associated with the region of interest based upon the fill perimeter. The method may further include calculating a quantity associated with the region of interest based upon the fill area. The method may further include calculating a quantity of the fill area. The document may be in PDF file format. The method may further include receiving a user input defining a portion of the open area boundary. The method may further include receiving a user input of a respective one of the visual objects, not associating the selected visual object with the open area boundary. The method may further include the step of generating a work image from the document. The step of generating a work image may include converting the document to a monochrome bitmap having a predetermined resolution. The bitmap may be defined by black and white pixels. The black pixels are associated with the open area boundary and the white pixels within the open area boundary are associated with the open area. The displaying of the fill area in each of the multiple time segments may be based upon the work image.

According to another embodiment of the present invention, there is provided an article of manufacture comprising a non-transitory program storage medium readable by a data processing apparatus. The medium tangibly embodies one or more programs of instructions executable by the data processing apparatus to perform a method of visually interacting with an electronically stored document having a plurality of visual objects as described above.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a document window of a graphical user interface for a document software application that implements various aspects of the contemplated by the present invention with a document being displayed in the document window;

FIG. 5 is the document window of FIG. 4 as depicted with a user input of a floor tool indicator;

FIG. 7 is the document window of FIG. 6 as depicted with region of interest as selected by a cursor;

FIG. 7a is a symbolic diagram of the document of FIG. 7 as depicted with the region of interest and an open area boundary;

FIG. 8 is the document window of FIG. 7 as depicted with a fill perimeter about a fill area;

FIG. 8a is a symbolic diagram of the document of FIG. 8 as depicted with an expanding fill perimeter and the open area boundary;

FIG. 10 is the document window of FIG. 9 as depicted with the expanding fill perimeter and the fill area;

FIG. 10a is a symbolic diagram of the document of FIG. 10 as depicted with the expanding fill perimeter, the fill area and the open area boundary;

FIG. 12 is the document window of FIG. 7 as depicted with a wall tool object;

FIG. 12a is a symbolic diagram of the document of FIG. 12 as depicted with the region of interest and an open area boundary;

Common reference numerals are used throughout the drawings and the detailed description to indicate the same elements.

DETAILED DESCRIPTION

The detailed description set forth below in connection with the appended drawings is intended as a description of the presently preferred embodiment of a method of computerized presentation of a document set view for auditing information and managing sets of multiple documents. It is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
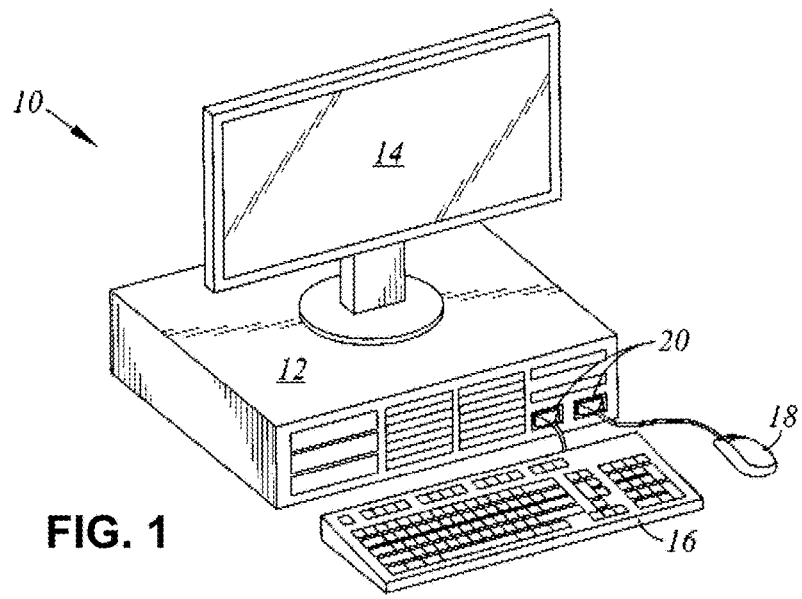
FIG. 1 is an exemplary computer system that may be capable to perform functions for use with aspects of the present invention including a display monitor.

FIG. 1 depicts an exemplary hardware environment in which various aspects of the contemplated method of presentation of a document set view for document management and arrangement may be implemented. Generally, there is a computer system 10 with a system unit 12 and a display device 14. The display device 14 produced a graphical output from the data processing operations performed by the system unit 12. Input devices including a keyboard 16 and a mouse 18, for example, may be manipulated by a user to generate corresponding inputs to the data processing operations, and are connected to the system unit 12 via ports 20. Various other input and output devices may be connected to the system unit 12, and different interconnection modalities are known in the art.

Figure 2:
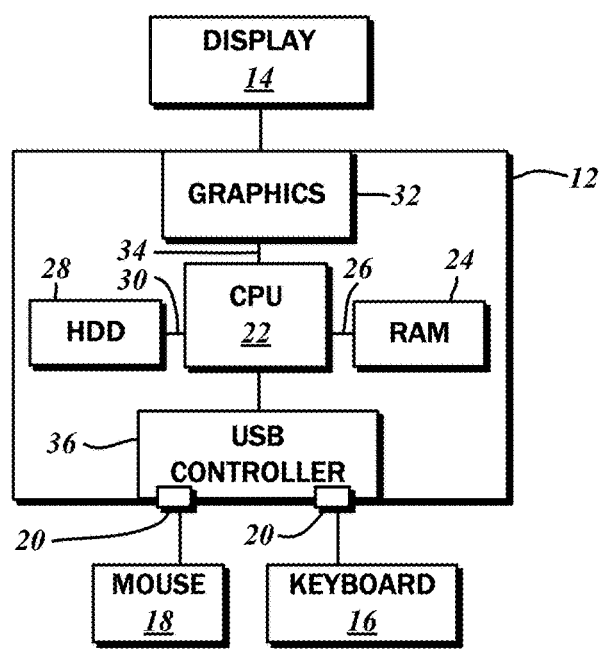
FIG. 2 is a block diagram of system components of the exemplary computer system of FIG. 1.

As shown in the block diagram of FIG. 2, the system unit 12 includes a processor (CPU) 22, which may be any conventional type. A system memory (RAM) 24 temporarily stores results of the data processing operations performed by the CPU 22, and is interconnected thereto typically via a dedicated memory channel 26. The system unit 12 may also include permanent storage devices such as a hard drive 28, which is also in communication with the CPU 22 over an input/output (I/O) bus 30. A dedicated graphics module 32 may also be connected to the CPU 22 via a video bus 34, and transmits signals representative of display data to the display device 14. As indicated above, the keyboard 16 and the mouse 18 are connected to the system unit 12 over the port 20. In the embodiments where the port 20 is a USB type, there may be a USB controller 36 that translates data and instructions to and from the CPU 22 for the external peripherals connected via the port 20 or wirelessly connected such as via Bluetooth connectivity. Additional devices such as printers, microphones, speakers, and the like may be connected to the system unit 12 thereby.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display device 14. Generally, the operating system and the computer programs are tangibly embodied in a computer-readable medium, e.g., the hard drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure. Typically, documents and their associated files are stored in a hierarchical file system of the hard drive 28 or any other accessible storage device.

According to one embodiment, a user can interact with the computer system 10, and specifically with the graphics being generated on the display device 14, via the mouse 18. The movement of a cursor generated on the display device 14 is tied to the movement of the mouse 18, with further interactivity being provided with input from the mouse buttons. Input from the keyboard 16 also provides interactivity with the computer system 10.

Although certain features of the present disclosure are described in relation to a computer system with such input and output capabilities, specifics thereof are presented by way of example only and not of limitation. Any alternative graphical user interfaces such as touch interfaces and pen/digitizer interfaces may be substituted. The analogs of those features will be readily appreciated, along with suitable modifications to accommodate these alternative interfaces while still achieving the same functionalities.

Along these lines, the foregoing computer system 10 represents only one exemplary apparatus of many otherwise suitable for implementing aspects of the present disclosure, and only the most basic of the components thereof have been described. It is to be understood that the computer system 10 may include additional components not described herein, and may have different configurations and architectures. Any such alternative is deemed to be within the scope of the present disclosure.

The present disclosure involves a method of visually interacting with an electronically stored document having a plurality of visual objects. As utilized herein, the term document refers to a standalone representation of data that can be opened, rendered and/or edited by a document reviewing software application. Accordingly, the document may be formatted and structured in a particular way so that its elements can be rendered consistently.

In the exemplary embodiment discussed herein, the document reviewing software application handles PDF documents, and the following description will be in reference thereto. The PDF standard accommodates the storage and presentation of the content of the document 36, i.e., the visual objects, as sets of vector data defining its characteristics, including object type, color, coordinate values of connected components of the object, and so forth. Alternatively, the PDF standard also accommodates the storage of the visual objects, and indeed, the entire document 36, as a raster or a bitmap defined by a multi-dimensional array of pixels.

Documents in any other format that are editable or viewable with any other software application may be substituted. It is understood that a document may include a single or multiple computer files, and each of such files may include one or more pages or drawing sheets. The term data object refers to a conceptual entity generally corresponding to a contiguous block of a specific size at a specific location in memory having one or more attributes that define the entity (coordinates, line width, color, font type, and so forth). Specific instances embodied in the visualizations and/or display of the same are intended to refer to a corresponding visual object. The visual objects capable of being created in a document may take the form of primitive geometric shapes created by defining opposed endpoints. The visual objects can also include complex shapes such as a polygon having multiple endpoints with segments interconnecting the same. The visual objects may be of any geometric shape, any free form or event annotations (such as text or other symbols).

The present invention is discussed in the context of method steps, some of which are optional and represent various embodiments or variations of the invention. In this regard, reference is made to the flowchart of FIG. 3. The method will now be discussed in the context of an exemplary user interface for a document reviewing software application that implements various aspects contemplated by the present invention.

Referring now to FIG. 4 there is depicted a document window 34. The document window 34 includes a presentation of a document 36 containing various visual objects. In this example, the document as presented in the document window 34 is that of a portion of an architectural drawing. It is understood that the document window 34 represents a portion of a graphical user interface of a software application that is used to display the document 36 on the display device 14. As one of ordinary skill in the art will appreciate, the system unit 12 and the software application would include programming for controlling the mouse 18, the keyboard 16 and/or other input device to interact with the graphical user interface. As such, though not depicted, it is further understood that such graphical user interface would include features and software tools, such as cursor controls, drop down menus, radio buttons, and so forth, for interacting with the document 36. Such interactions would be expected to include controls associated with selection and viewing of specific documents, editing and interacting with the content of the displayed document with respect to visual objects contained in the in the displayed document, and obtaining and annotating various items of information concerning the document 36 and its content.

The present invention contemplates a method of visually interacting with an electronically stored document having a plurality of visual objects. In the example of FIG. 4, the document 36 has various visual objects, such as the visual objects 38a-g which are representative of walls. The document 36 has various other visual objects, such as the visual object 40 which represents an informational annotation in the form of text string "VESTIBULE" and the text string "100B" which is included in a rectangular box. Many other visual objects are included, though not specifically identified with reference numerals, that are representative of measurements, index locations, material types, portions of walls (such as windows), as so forth.

Figure 3:
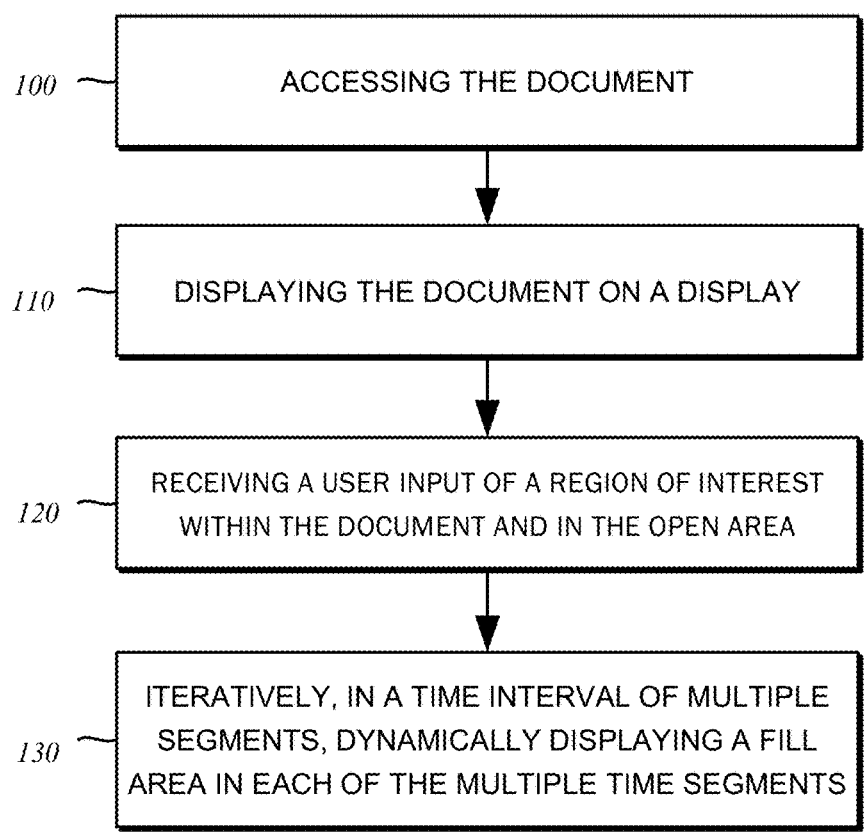
FIG. 3 is a flowchart depicting one embodiment of the method of visually interacting with an electronically stored document.

With reference to FIG. 3 of a flowchart depicting one embodiment of the method of visually interacting with an electronically stored document (such as the document 36), the method begins with a step 100 of accessing the document 36. Such accessing would include receiving on a computer, such as computer system 10, a user selection of the document 36. The document 36 includes a closed region 42 characterized by an open area boundary 44 surrounding an open area 46 as best viewed in the context of FIGS. 7 and 7a, as will be discussed in further detail below. Referring additionally to FIG. 7a, there is depicted a symbolic diagram of the document of FIG. 7 with the open area boundary 44 and open area 46. After having accessed the document 36, the method further includes the step 110 of displaying the document 36 on the display 14. For example, the document 36 is displayed in the document window 34 as depicted in FIG. 4.

Referring to FIG. 7, the method further includes the step 120 of receiving a user input of a region of interest 50 within the document 36 and in the open area 46. The user may use the mouse 18 to control a cursor 48 for navigating to a desired position. The user may then click an appropriate button input of the mouse 18 to indicate to the software application the desired location of the region of interest 50. In this example, the region of interest 50 is a discrete point location. However, it is contemplated that the region of interest 50 may take the form of a straight line, free form line, geometric shape or other shape, and may be of one or more items of the foregoing.

Referring additionally to FIGS. 8, 8a, 9, 9a, 10, 10a, 11, and 11a, the method further includes the step 130 of iteratively, in a time interval of multiple segments, dynamically displaying a fill area (such as respectively fill areas 54a-d) in each of the multiple time segments. The fill area 54 is defined by outwardly expanding vertices from the region of interest 50 and bounded by an expanding fill perimeter (such as respectively fill perimeters 52a-d) limited by the open area boundary 44. The fill area (such as the fill area 54d) is coextensive with the open area 46 upon the fill perimeter (such as the fill perimeter 52d) coinciding with the open area boundary 44.

Figure 9A:
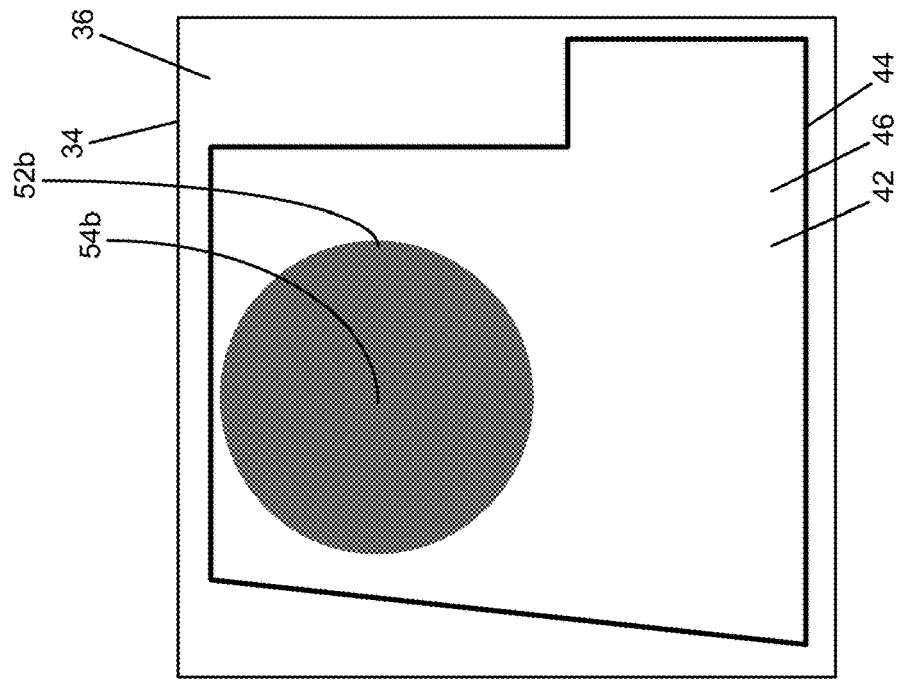
FIG. 9a is a symbolic diagram of the document of FIG. 9 as depicted with the expanding fill perimeter, the fill area and the open area boundary.
Figure 9:
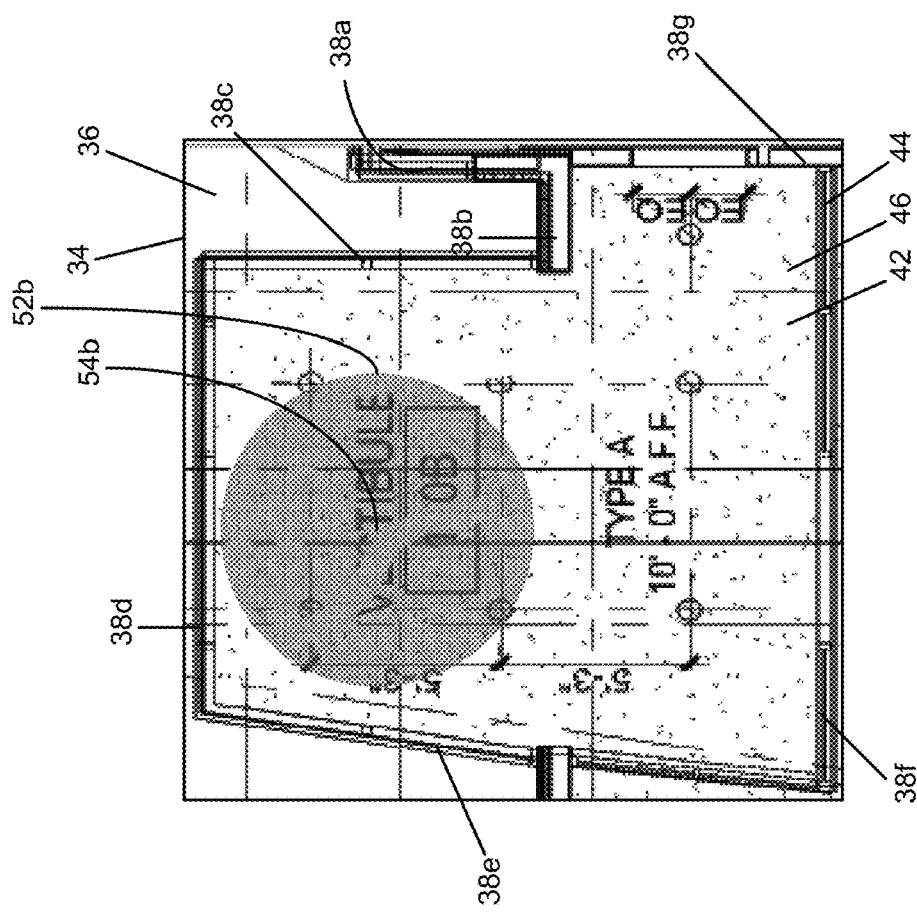
FIG. 9 is the document window of FIG. 8 as depicted with the expanding fill perimeter and the fill area.

FIG. 8 is the document window 34 of FIG. 7 as depicted with the fill perimeter 52a about a fill area 54a. FIG. 8a is the corresponding symbolic diagram of the document of FIG. 8 as depicted with the expanding fill perimeter 52a and the fill area 54a. The fill perimeter 52a is contemplated to have expanded from the selected region of interest 50. As the region of interest 50 in this exemplary embodiment is a discrete point, the expanding fill perimeter 52a takes the form of a circle with the region of interest 50 at its center. FIG. 9 is the document window 34 of FIG. 8 as depicted with the expanding fill perimeter 52b about the fill area 54b. FIG. 9a is the corresponding symbolic diagram of the document of FIG. 9 as depicted with the expanding fill perimeter 52b and the fill area 54b. The fill perimeter 52b is contemplated to have expanded from the fill perimeter 52a. As mentioned above, the fill area 54 is defined by outwardly expanding vertices. In this regard, it is understood that the vertices are distributed along and define the fill perimeter 52. The number of vertices may be a function of the graphics resolution of the document 36. The algorithms and programming techniques for determining the expanding fill perimeter 52 and associated fill area 54 and the related outwardly expanding vertices may be chosen from those which are well known to one of ordinary skill in the art.

Continuing with the sequence of expansion, FIG. 10 is the document window 34 of FIG. 9 as depicted with the fill perimeter 52c about the fill area 54c. FIG. 10a is the corresponding symbolic diagram of the document of FIG. 10 as depicted with the expanding fill perimeter 52c and the fill area 54c. The expanding fill perimeter 52c is contemplated to have expanded from the fill perimeter 52b. In this example, the expanding fill perimeter 52c is limited by portions of the open area boundary 44, namely, those portions of the open area boundary 44 associated with visual objects 38b, 38c, 38d, 38e, 38f and 38g. As mentioned above, it is contemplated that visual objects 38b, 38c, 38d, 38e, 38f and 38g are associated with walls in the context of the document 36. Such walls would thus act to limit the expansion of the expanding perimeter 52c and its associated fill area 54c.

Figure 11A:
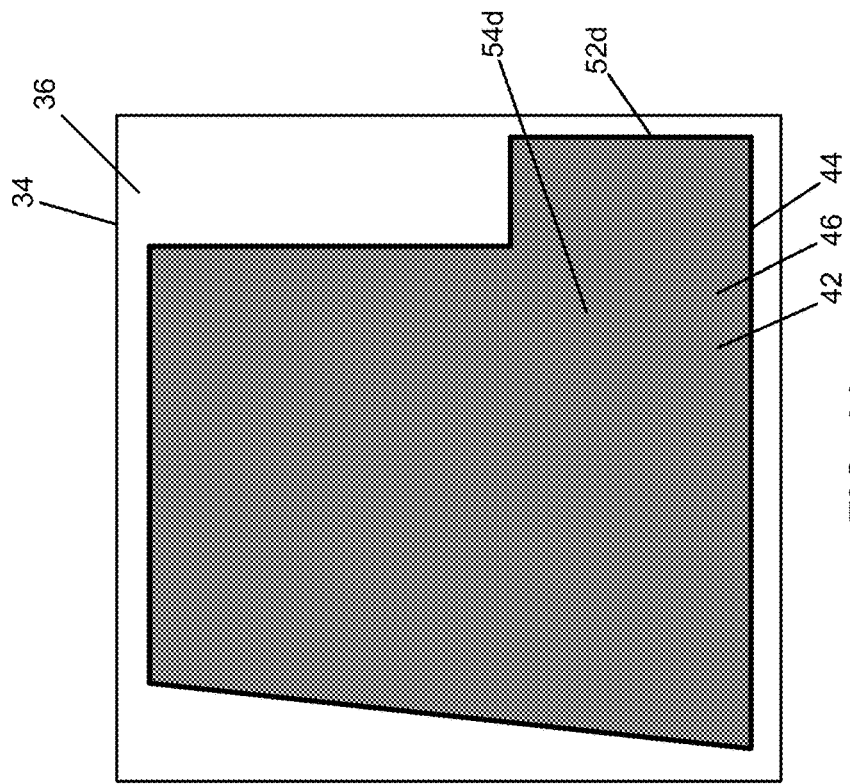
FIG. 11a is a symbolic diagram of the document of FIG. 10 as depicted with the expanding fill perimeter, the fill area and the open area boundary.
Figure 11:
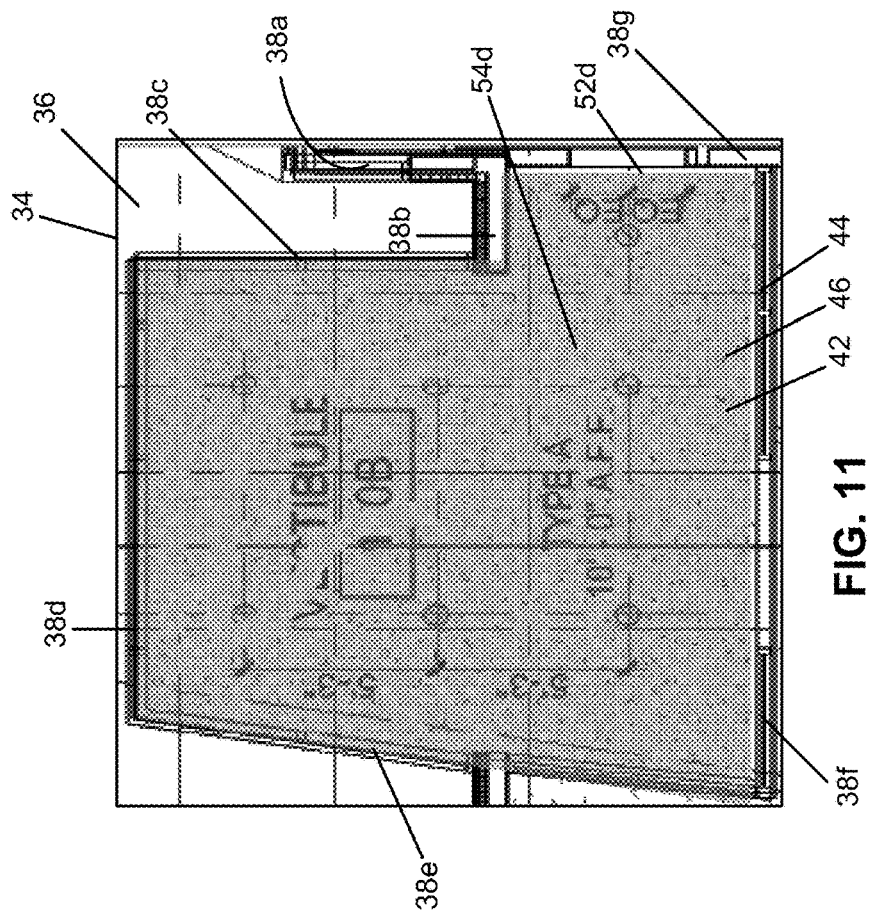
FIG. 11 is the document window of FIG. 10 as depicted with the expanding fill perimeter coextensive with the open area boundary.

Continuing with the sequence of expansion, FIG. 11 is the document window 34 of FIG. 10 as depicted with the fill perimeter 52d about the fill area 54d. FIG. 11a is the corresponding symbolic diagram of the document of FIG. 11 as depicted with the expanding fill perimeter 52d and the fill area 54d. The expanding fill perimeter 52d is contemplated to have expanded from the fill perimeter 52c. The fill area 54d is coextensive with the open area 46 with the fill perimeter 52d coinciding with the open area boundary 44. In this regard, the expanding fill perimeter 52d is completely limited by the open area boundary 44.

As mentioned above, the method includes the step 130 of iteratively, in a time interval of multiple segments, dynamically displaying a fill area (such as respectively fill areas 54a-d) in each of the multiple time segments. It is understood that the various states of the respective fill areas 54a-d as displayed in in FIGS. 8-11 represent the state of the fill area 54 at different segments of time. In practice, it is contemplated that that such displaying many utilize many segments than those few exemplary ones of FIGS. 8-11. This could create a visual animation effect with the expanding fill perimeter 52 and the fill area 54 appearing to smoothly grow and expand outward until the expanding fill perimeter encounters the open area boundary 44. As used herein the term iteratively refers to the repeated redisplaying of the fill area 54 at each different sequential of time.

As used herein the term dynamically displaying refers to the fill area 54 being repeatedly displayed at different sequential times. It is contemplated that such dynamic displaying would be within a time interval while the user is expected to be able to observe and comprehend the expanding nature of the fill area 54. In this regard, where the time interval were to be set to hundredth of a second, the user may not be able to adequately observe and comprehend that the fill area 54 is expanding. Rather, it may likely be that the user would first observe the location of region of interest 50 and then simply observe the fill area 54 being coextensive with the open area 46. Thus, the fill area 54 would appear to instantly jump or materialize as displayed to the user. In contrast, where the time interval were to be set to three seconds and such time interval being divided into one hundred time segments, the user may likely observe an animated fluid flood effect with the fill area 54 growing in size during the three second interval. The visual effect may be analogized to an endless bucket of paint being spilled on a floor surface at the region of interest 50. In such analogy, the paint would outwardly spread outward until being limited in growth upon reaching a wall structure, and the paint would be comparable to the fill area 54 and the open area boundary 44 being comparable to various wall structures forming the closed region 42.

It is contemplated that in the context of highly detailed and complex drawing documents, there may be instances where the closed region 42 is much larger than what the user is expecting or includes sections that the user does not intend. The user may not realize that the region which the user believes to be a closed in nature is actually is not closed. In other instances, the software application may misidentify a visual object as forming a part of an open area boundary (i.e., not properly identifying visual objects as representing wall structures). In the absence of the foregoing described dynamic displaying, even after being presented with a displayed fill area, the user may not be able to readily identify how to address the mismatch in the intended outcome (i.e., having the software application result in an output consistent with the user's expected fill area). The above described dynamic display provides the user with insights into the nature of the various regions about the region of interest 50 where the expanding fill area 54 expands. For example, in a large detailed architectural plan with many rooms and corridors, the user may only be interested in a fill area associated with a relatively small area or room. If such area or room does not have a corresponding closed region, then upon executing an area filling feature, a much larger than expected fill area would be displayed. However, the above described dynamic display would present the user with the growing fill area and the user could more readily identify area or points where there is unintended "leakage" (i.e., where there should be a recognized wall structure and portion of the open area boundary 44).

According to various embodiments of the present invention, the method may further include calculating a quantity associated with the region of interest 50 based upon the fill perimeter (such as the linear distance of the fill perimeter). The method may further include calculating a quantity associated with the region of interest based upon the fill area (such as the actual square area, or derivative quantities, such as weight associated with a certain material corresponding the square area). Such quantities may be used for material take off analysis purposes.

The method may further include receiving a user input defining a portion of the open area boundary. In this regard, referring now to FIG. 12 there is depicted the document window 34 of FIG. 7 as depicted with a wall tool object 60. The software application may be provided with functionality or a tool to allow the user to "add" "wall sections" at desired locations about the document 36. The intent of such wall tool is to add artificial boundaries to constrain the expanding fill area where walls do not appear in document 35 (such as to "close" doorways for example). In this regard, a newly placed wall tool object 60 is contemplated to form a portion of an open area boundary 64 about an open area 66 of a closed region 62. In this example, the open area boundary 64, namely, those portions of the open area boundary 44 associated with visual objects 38c, 38d, 38e, 38f and the newly added wall tool object 60. In this example, the expanding fill perimeter 52c is limited by portions of the open area boundary 44, namely, those portions of the open area boundary 44 associated with visual objects 38c, 38d, 38e, and 38f. The user may use the mouse 18 to control the cursor 48 for navigating to a desired position. The user may then click control the mouse 18 to indicate to the software application the desired location of the region of interest 58. Referring additionally to FIG. 12a, there is depicted a symbolic diagram of the document of FIG. 12 as depicted with the region of interest 58, the closed region 62, the open area boundary 64, and the open area 66.

Figure 13A:
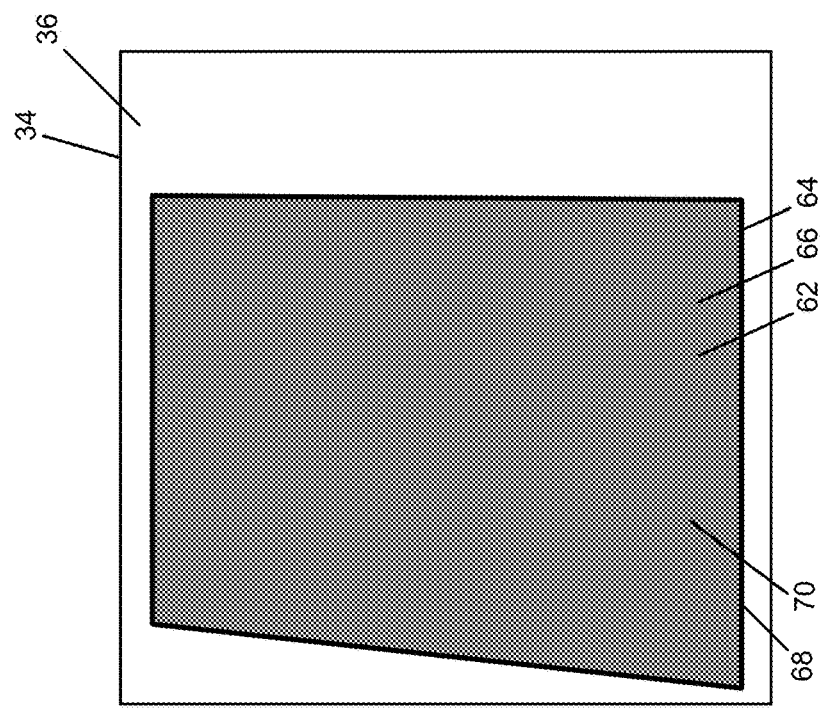
FIG. 13a is a symbolic diagram of the document of FIG. 13 as depicted with the expanding fill perimeter, the fill area and the open area boundary.
Figure 13:
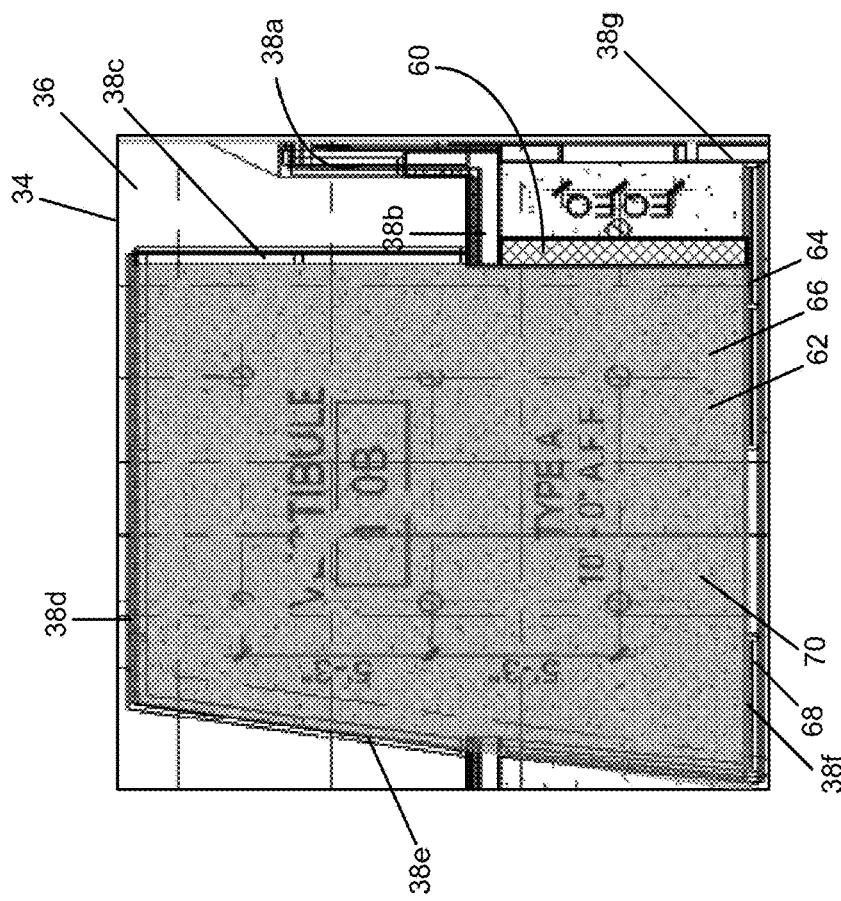
FIG. 13 is the document window of FIG. 12 as depicted with an expanding fill perimeter coextensive with the open area boundary.

The above described steps for the dynamic display of an expanding fill area may be then implemented using this newly revised open area boundary 64. In this regard, FIG. 13 is the document window 34 of FIG. 12 as depicted with an expanding fill perimeter 68 being coextensive with the open area boundary 64. FIG. 13a is a symbolic diagram of the document of FIG. 13 as depicted with the expanded fill perimeter 68, the fill area 70 and the open area boundary 64.

Figure 6:
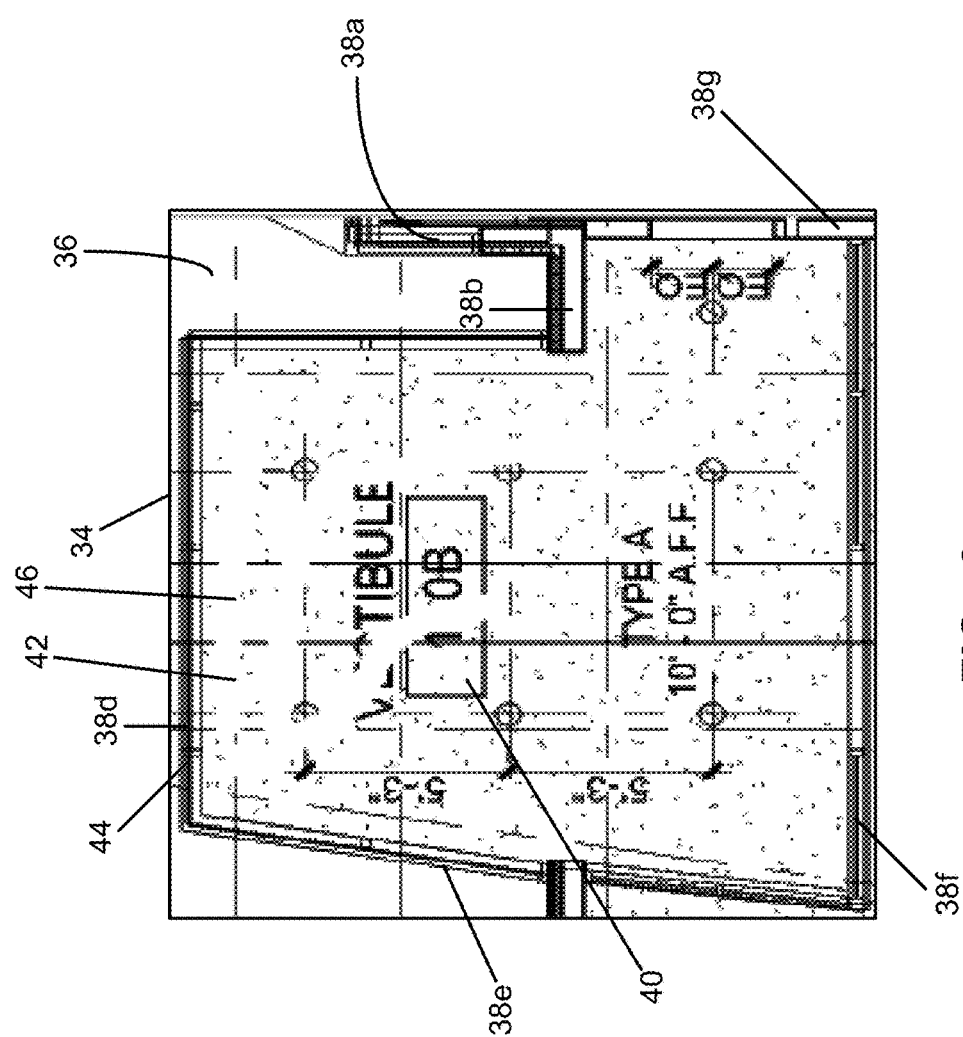
FIG. 6 is the document window of FIG. 5 as depicted with the floor tool indicator having been removed.

The method may further include receiving a user input of a respective one of the visual objects, not associating the selected visual object with the open area boundary 44. Referring now to FIG. 5, there is depicted the document window 36 of FIG. 4 as depicted with a user input of floor tool indicators 56a and 56b. The floor tool indicators 56a and 56b are the resulting footprint of use of a floor tool indicating where areas are to be removed or otherwise not to be associated with the open area boundary 44. The floor tool indicators 56a and 56b are overlapping portions of the visual object 40. The software application may be provided with functionality or a tool to allow the user to "erase" or "paint over" visual objects so that the software application would not interpret such visual objects as being potentially portions of an open area boundary (i.e., not a wall structure). The intent of such a floor tool is to allow the user to mark and remove any lines in a floorplan diagram that should have been ignored but were instead spuriously treated by the algorithm as walls. In this example, the user may be concerned that the software application may erroneously interpret portions of the visual object 40 as being a wall structure and therefore a portion of the open area boundary 44. It is contemplated that the user may provide an input to the software application that the user is satisfied with the resultant floor tool indicators 56a and 56b. In this regard, FIG. 6 depicts the document window 36 of FIG. 5 as depicted with the floor tool indicators 56a and 56b having been removed as well as portions of the visual object 40.

The method may further include the step of generating a work image from the document 36. In this regard, after step 100 of accessing the document, the method may include the step of generating work image that includes converting the document 36 to a monochrome bitmap having a predetermined resolution. The bitmap may be defined by black and white pixels. The black pixels are associated with the open area boundary and the white pixels within the open area boundary are associated with the open area. This conversion may be done by making the assumption that a document in PDF format may be displayed, without loss of relevant content, as a grayscale line drawing in which the background is close to white and the foreground (walls, labels, etc.) are close to black. A bimodal distribution in gray values in which the two modes correspond to the background and the foreground may be assumed. Such conversion process may be chosen from those which are well known to one of ordinary skill in the art, such as those techniques to binarize such an image by finding the best gray-level between the two modes for use as a threshold according to "Otsu's method." The output of this process may result in the work image. White pixels in the work image may be assumed to correspond to empty space in the drawing document (i.e., a floor), and black pixels may be assumed to correspond to either an open area boundary (i.e., a wall structure) or various kinds of "noise." Such "noise" may take the form any lines or visual objects that do not represent room boundaries in the floorplan diagram (e.g., text content, document layout structures, annotations, callouts, etc.). As such the displaying of the fill perimeter 52 and the fill area 54 in each of the multiple time segments may be based upon the work image. It is contemplated that the work image may be over laid upon the original document 36. In this regard, the various manipulations of the document discussed above with respect to the floor tool and wall tool is understood to be implemented upon the work image. This is because the artificial "erasing" and "adding" of visual objects are merely intended to facilitate the displaying of the fill perimeter 52 and the fill area 54 and calculations associated therewith, and not to actually alter or edit the document 36 itself.

According to another embodiment of the present invention, there is provided an article of manufacture comprising a non-transitory program storage medium readable by a data processing apparatus. The medium tangibly embodies one or more programs of instructions executable by the data processing apparatus to perform a method of visually interacting with an electronically stored document having a plurality of visual objects as described above.

The particulars shown herein are by way of example and for purposes of illustrative discussion of the embodiments of the present disclosure only and are presented in the cause of providing what is believed to be the most useful and readily understood description of the principles and conceptual aspects of the disclosure. In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. A method of visually interacting with an electronically stored document having a plurality of visual objects, the method comprising:
   accessing the document, the document including a closed region characterized by an open area boundary surrounding an open area;
   displaying the document on a display;
   receiving a user input of a region of interest within the document and in the open area; and
   in response to receiving the user input and without receiving any additional user input, iteratively displaying, over a time interval of multiple time segments, a fill area, the fill area being defined visually by outwardly expanding vertices from the region of interest and bounded by an expanding fill perimeter limited by the open area boundary, the fill area becoming coextensive with the open area upon the expanding fill perimeter coinciding with the open area boundary, wherein the multiple time segments comprise more than two time segments, and wherein the fill area expands into an unintended space in the document before the expanding fill perimeter coincides with the open area boundary, the unintended space being a region that the user does not intend to be a part of the open area.

2. The method of claim 1 further comprising:
   calculating a quantity associated with the region of interest based upon the fill perimeter.

3. The method of claim 1 further comprising:
   calculating a quantity associated with the region of interest based upon the fill area.

4. The method of claim 1 further comprising:
   calculating a quantity of the fill area.

5. The method of claim 1 wherein the document is in PDF file format.

6. The method of claim 1 further comprising:
   receiving a user input defining a portion of the open area boundary.

7. The method of claim 1 further comprising:
   generating a work image from the document.

8. The method of claim 7 wherein generating the work image further comprises converting the document to a monochrome bitmap having a predetermined resolution.

9. The method of claim 8 wherein the monochrome bitmap is defined by black and white pixels, the black pixels being associated with the open area boundary, the white pixels within the open area boundary being associated with the open area.

10. The method of claim 7 wherein the displaying of the fill area in each of the multiple time segments is based upon the work image.

11. The method of claim 1, further comprising:
    prior to receiving the user input of the region of interest, receiving a user input of a floor tool indicator within the document, the floor tool indicator being painted over visual elements that are not to be associated with the open area boundary, wherein the iteratively displaying of the fill area is performed based on the user input of the floor tool indicator and the user input of the region of interest.

12. An article of manufacture comprising a non-transitory program storage medium readable by a data processing apparatus, the medium tangibly embodying one or more programs of instructions executable by the data processing apparatus to perform a method of visually interacting with an electronically stored document having a plurality of visual objects, the method comprising:
    accessing the document, the document including a closed region characterized by an open area boundary surrounding an open area;
    displaying the document on a display;
    receiving a user input of a region of interest within the document and in the open area; and
    in response to receiving the user input and without receiving any additional user input, iteratively displaying, over a time interval of multiple time segments, a fill area, the fill area being defined visually by outwardly expanding vertices from the region of interest and bounded by an expanding fill perimeter limited by the open area boundary, the fill area becoming coextensive with the open area upon the expanding fill perimeter coinciding with the open area boundary, wherein the multiple time segments comprise more than two time segments, and wherein the fill area expands into an unintended space in the document before the expanding fill perimeter coincides with the open area boundary, the unintended space being a region that the user does not intend to be a part of the open area.

13. The article of manufacture of claim 12, wherein the method further comprises:
    prior to receiving the user input of the region of interest, receiving a user input of a floor tool indicator within the document, the floor tool indicator being painted over visual elements that are not to be associated with the open area boundary, wherein the iteratively displaying of the fill area is performed based on the user input of the floor tool indicator and the user input of the region of interest.

* * * * *